J. Sherwood,
Potato Digger.

No. 93,015. Patented July 27, 1869.

Witnesses:
J. Hinchman
Jno. H. Brooks

Inventor:
J. Sherwood
Per Munn & Co.
Attorneys.

United States Patent Office.

JOHN SHERWOOD, OF OTTUMWA, IOWA.

Letters Patent No. 93,015, dated July 27, 1869.

IMPROVEMENT IN POTATO-DIGGER.

The Schedule referred to in these Letters Patent and making part of the same.

*To all whom it may concern:*

Be it known that I, JOHN SHERWOOD, of Ottumwa, in the county of Wapello, and State of Iowa, have invented a new and improved Potato-Digger;—and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish a simple, convenient, and effective potato-digger, which shall be so constructed and arranged as to do its work easily and thoroughly, leaving the potatoes spread over the surface of the ground; and It consists in the construction and combination of the various parts of the machine, as hereinafter more fully described.

Figure 2:
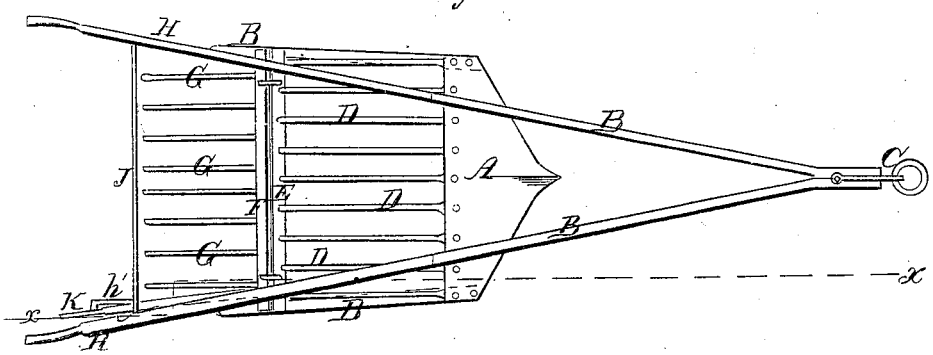
Figure 2 is a top or plan view of the same.

A is the plow, or shovel, which is made of steel, and in about the shape shown in fig. 2.

To the under side of the ends of the plow A are attached the ends of the bars B, which extend back, to form a smooth surface or runners for the machine to run upon.

The bars B then curve upward and forward, and their upper or forward ends meet, as shown in fig. 2, and to them is attached the clevis C.

To the rear part of the plow, or shovel A are attached the forward ends of the rods D, at such a distance apart as not to allow the potatoes to pass through, while allowing the dirt raised with said potatoes to pass through freely.

The rear ends of the rods D are passed through the cross-bar E, to which they are secured by screw-nuts, so that the rear ends of said rods may be raised or lowered, as desired.

The ends of the cross-bar E are bent downward, and are securely attached to bars B, the downwardly-projecting ends of said bar being of such a length as to raise the body of said bar E, and consequently the rear ends of the rods D, to a suitable height.

Figure 1:
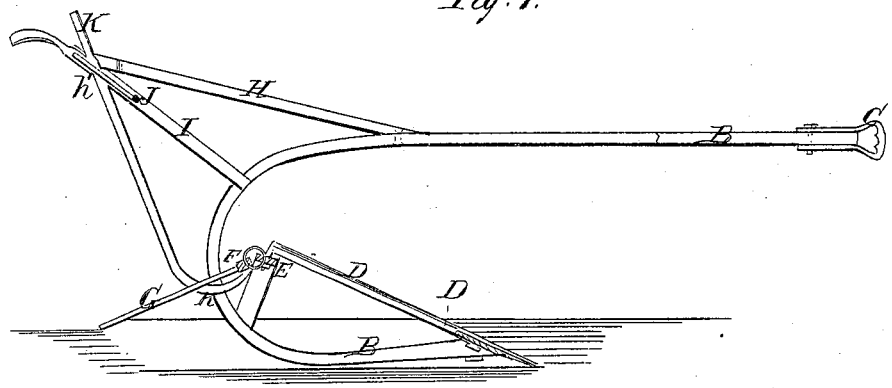
Figure 1 is a side view of my improved potato-digger, partly in section, through the line $x$ $x$, fig. 2.

To the cross-bar E is connected another cross-bar, F, by rings or hinges, as shown in figs. 1 and 2.

To the cross-bar F are securely attached the forward ends of the rods G, the rear ends of which trail upon the ground, so as to form an inclined apron, down which the potatoes roll, and which allows any dirt that may still adhere to said potatoes to pass through freely.

H are the handles, the forward ends of which are securely attached to the bars B, and which are strengthened by inclined braces, I.

The handles H are connected and held in their proper relative positions by one or more cross-bars or rounds, J.

K is a lever, the lower end of which is secured to the side of the apron F G, and its upper end extends up along the inner side of one of the handles H, where it is kept in place by a long keeper, $h'$, by which its movement is limited, so that by moving the upper end of the lever K forward, the apron F G may be raised from the ground, for convenience in backing and turning the machine.

Having thus described my invention,

I claim as new, and desire to secure by Letters Patent—

1. An improved potato-digger, formed by the combination of the plow or shovel A, curved bars B, rods D, cross-bar E, hinged cross-bar F, rods G, and handles H I with each other, substantially as herein shown and described, and for the purpose set forth.

2. The apron F G, constructed as herein described, and provided with the lever K, working in the keeper $h'$, when arranged with reference to the rods D, curved bars B, and handle H, as set forth and shown.

JOHN SHERWOOD.

Witnesses:
C. E. FULTON,
T. R. WALLACE.